May 14, 1935.  I. COWLES  2,000,925
LUBRICANT DISCHARGE VALVE FOR FORCEFEED LUBRICATING SYSTEMS
Filed Aug. 26, 1929  3 Sheets-Sheet 1

Inventor.
Irving Cowles
Attorney.

May 14, 1935. I. COWLES 2,000,925
LUBRICANT DISCHARGE VALVE FOR FORCEFEED LUBRICATING SYSTEMS
Filed Aug. 26, 1929 3 Sheets-Sheet 2

Inventor.
Irving Cowles
By
Attorney.

May 14, 1935.  I. COWLES  2,000,925
LUBRICANT DISCHARGE VALVE FOR FORCEFEED LUBRICATING SYSTEMS
Filed Aug. 26, 1929  3 Sheets-Sheet 3

Inventor
Irving Cowles
By Rudolph Wm Lotz
Attorney

Patented May 14, 1935

2,000,925

UNITED STATES PATENT OFFICE 2,000,925

LUBRICANT DISCHARGE VALVE FOR FORCEFEED LUBRICATING SYSTEMS

Irving Cowles, Detroit, Mich., assignor to Union Bank of Chicago, Chicago, Ill., a corporation of Illinois, as trustee Application August 26, 1929, Serial No. 388,323

17 Claims. (Cl. 184—7)

This invention relates to improvements in discharge valves for force-feed lubricating systems wherein lubricant is discharged from a pump through piping to bearings etc. to be lubricated, the valve of the present invention being adapted to be interposed between the bearing and the piping or tubing and operative to automatically shut off flow of the lubricant to the bearing after a substantially predetermined volume of said lubricant has been discharged to said bearing.

The main object of the present invention is to provide a valve of the aforesaid type which will operate in connection with a pump wherein the pressure is gradually built up from zero to the desired point either by slow movement of the pump piston or an intermittent movement thereof, and which will also operate efficiently in connection with a pump wherein the pressure is built up to the desired high point by a very rapid movement of the piston as, for example, under the influence of an actuating spring.

A further object of the invention is to provide a valve of the type specified which is well adapted for use in systems wherein lubricant of high viscosity such as grease as distinguished from the more fluent oils.

In the accompanying drawings illustrating suitable embodiments of the invention:

Figure 1:
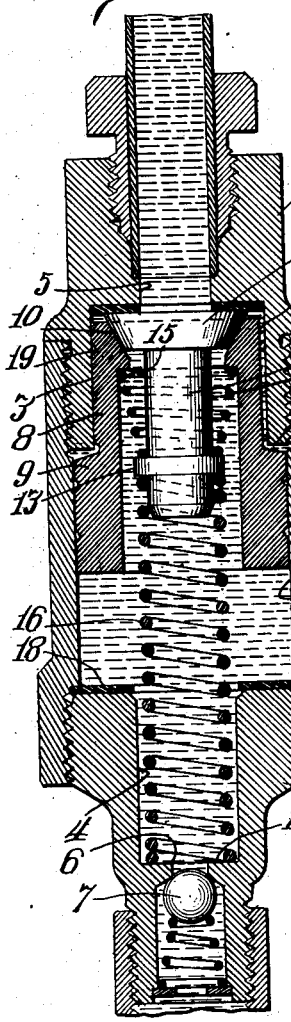
Fig. 1 is a central longitudinal section of a valve-structure embodying the invention showing the movable valve-structure members thereof in normal position.
Figure 2:
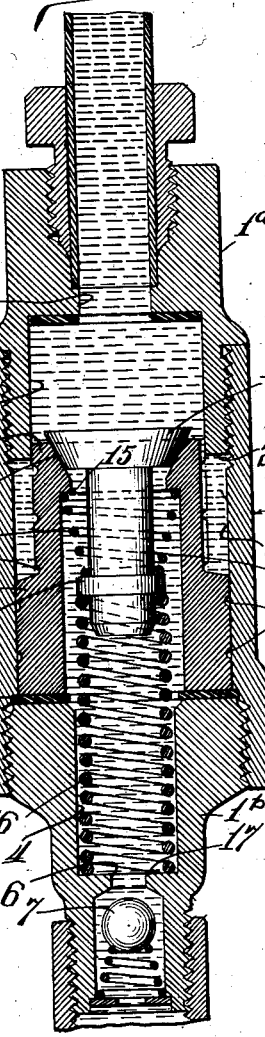
Fig. 2 is a similar view showing said movable valve members at the other limit of their movement.
Figure 3:
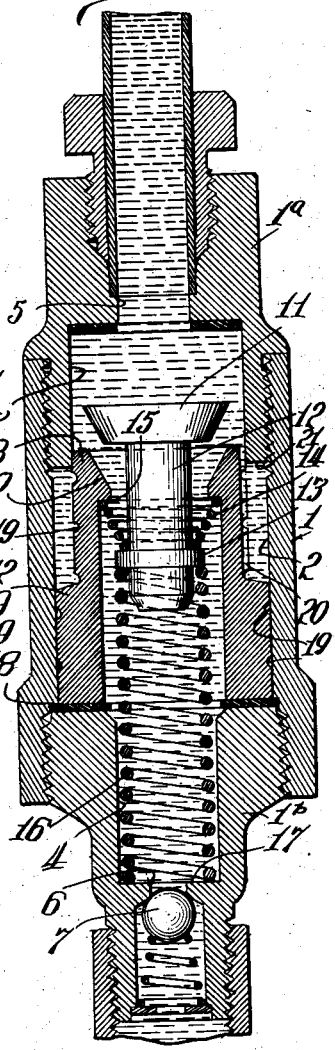
Fig. 3 is a similar view showing the movable valve members in relative positions immediately following release of pump pressure and preparatory to return of said valve members to initial position.
Figure 4:
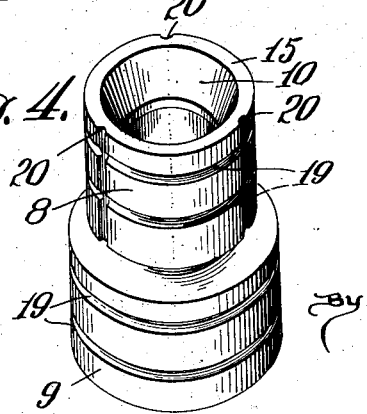
Fig. 4 is a perspective view of the piston element of the structure of Figs. 1 to 3.
Figure 5:
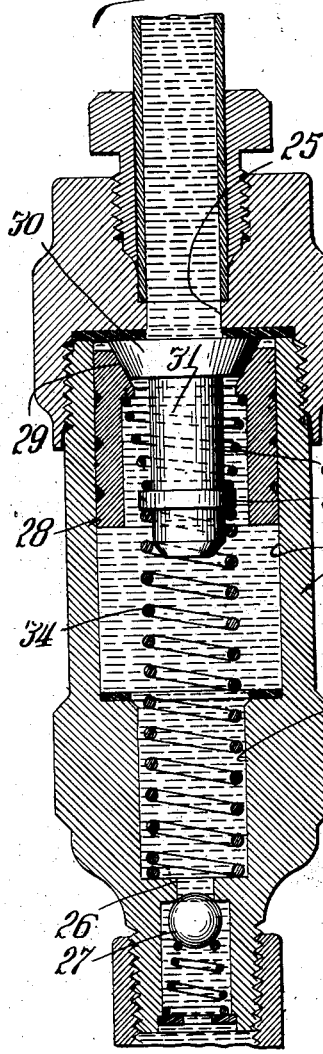
Figure 6:
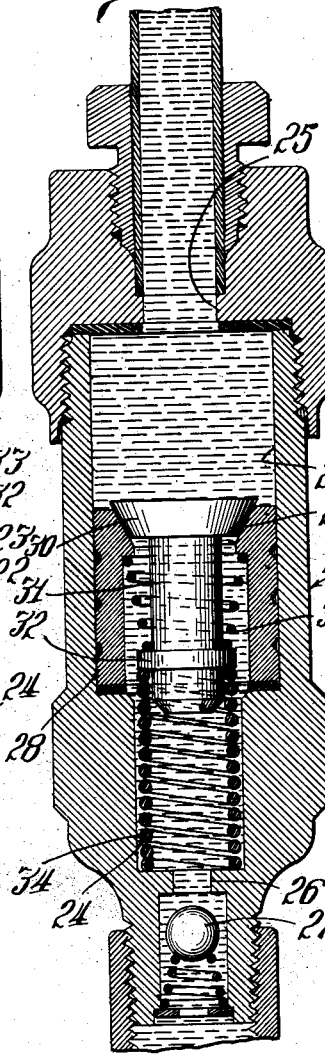
Figure 7:
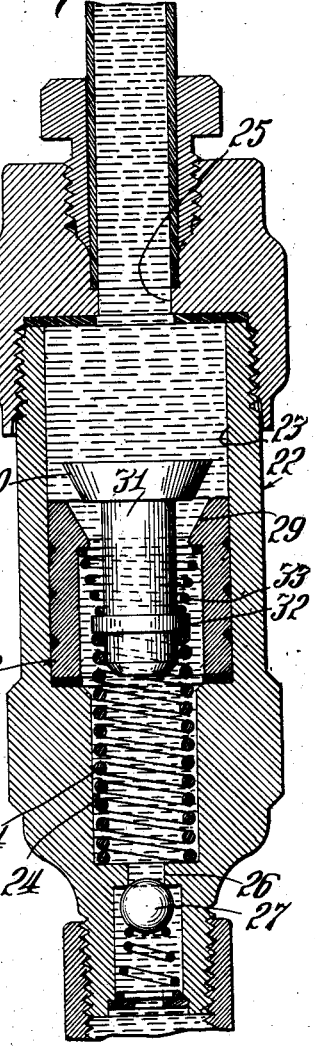

Figs. 5, 6, and 7 are views similar to Figs. 1, 2, and 3, respectively, illustrating another embodiment of the invention.

Figure 8:
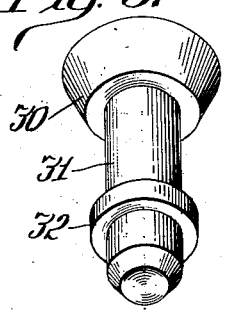

Fig. 8 is a perspective view of the valve associated with the piston elements of the structures of Figs. 1 to 3, and 5 to 7, respectively.

Figure 9:
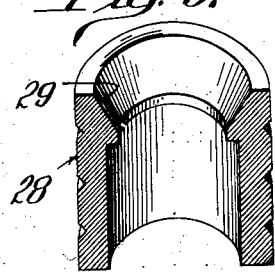

Fig. 9 is a perspective view of the piston element of Figs. 5 to 7 inclusive.

Figure 10:
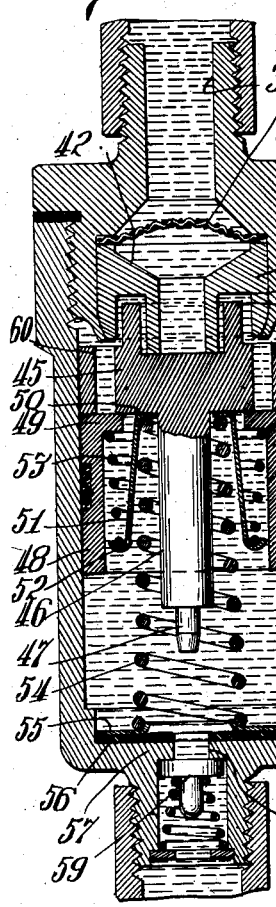
Figure 11:
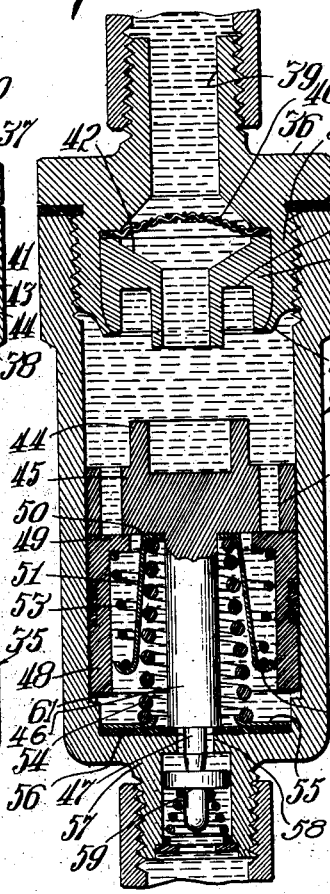
Figure 12:
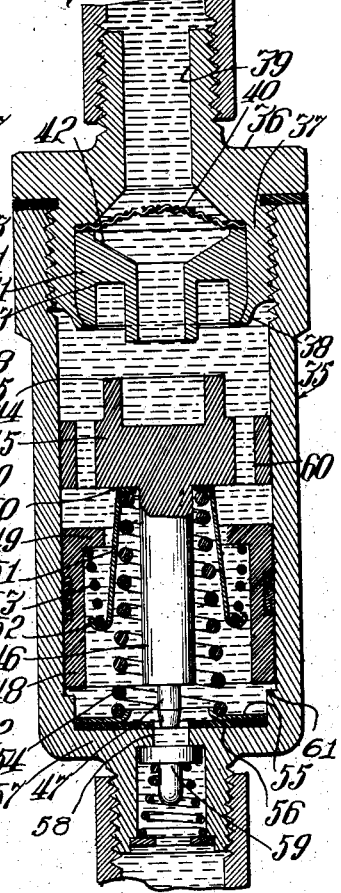

Figs. 10, 11, and 12 are views similar to Figs. 1, 2, and 3, respectively, illustrating still another embodiment of the invention.

Figure 13:
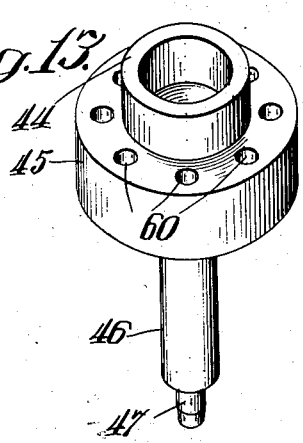

Fig. 13, is a perspective view of the valve member of Figs. 10, 11, and 12.

Referring now to Figs. 1 to 3 inclusive, it will be seen that the valve comprises a casing 1 having an internal stepped cylindrical bore comprising a large diameter portion 2 and smaller diameter portions 3 and 4, said bores being axially aligned with each other and with the intake port 5 and discharge port 6, respectively. The latter is suitably equipped with a spring-held check-valve 7.

The casing may comprise the middle or body portion 1 and two end members 1ª and 1ᵇ as shown, as this will permit middle portions 1 of different lengths to be assembled with end members 1ª and 1ᵇ of standard demensions to produce valve structures of different capacities.

Reciprocable in the bore 3—2 is a hollow trunk-piston 8 having a central opening in the end opposed to the intake port 5 and provided at its other end with an annular flange 9 adapted to fairly snugly fit the bore portion 2. The said central opening is bordered by a valve-seat 10 on which the valve 11 is normally seated.

The valve 11 is provided with a stem 12 extending axially through the piston 8 and provided between its ends with an annular flange 13. A helical compression spring 14 bears at one end on the said flange 13 and at its other end upon the annular shoulder 15 of the piston 8 below the valve-seat 10. This spring acts to maintain the valve 11 normally seated.

Another compression spring 16 bears at one end upon the other face of the said flange 13 and at its other end upon the annular shoulder 17 bordering the discharge port 6. The last-mentioned spring is stronger than the first-mentioned one for reasons hereinafter particularly pointed out.

At the lower end of the bore portion 2 is an annular shoulder 18 constituting a valve-seat on which the flanged end portion of the piston 8 seats to interrupt flow from the intake end portion to the discharge end portion of the casing.

The trunk piston 8 is provided with annular grooves 19 ordinarily termed "oil grooves" and is also provided with one or more longitudinal grooves 20 extending from the valved end of the piston to the flange 9. The length of the piston 8 is such that when the flange 9 rests upon the seat-shoulder 18, the other end of said piston will project partially into the bore-portion 2. The length of the bore-portion 2 is slightly less than the length of the body portion of the piston 8 so that when said piston is disposed in the position shown in Fig. 1, the flange 9 will be slightly spaced from the annular shoulder 21 of the bore-portion 3.

The type of pump used to introduce lubricant under pressure into the casing 1 may be an ordinary piston pump having a free discharge port, i. e. a discharge port devoid of a check-valve or may be pumps of the types illustrated and described in my copending applications, Serial No. 98,886, filed March 31, 1926; Serial No. 131,843, filed Aug. 27, 1926; and Serial No. 221,197, filed Sept. 28, 1927, or any other type wherein the piping pressure may be completely relieved following a discharge of lubricant under pressure.

The operation of the valve is as follows:

The piston 8 being in the position shown in Fig. 1 and assuming that, by virtue of previous operation, the entire casing 1 is filled with the lubricant, then upon introducing lubricant under pressure, the piston 8 will begin its discharge stroke to force lubricant in its path past the check-valve 7.

As soon as the closed valve 11 has moved away from the intake end of the casing 1, it is, of course, subject to the full force of action of the spring 16 which, being far stronger than the spring 14, would normally overcome the latter. But as the piston is being moved by reason of the pressure of incoming lubricant and the area of the face of the piston opposed to the discharge port 6 is far greater than that of the other end of said piston, the travel of the latter is sufficiently resisted to overcome the pressure of the spring 16. This resistance to travel of the piston is augmented by the fact that the cross-sectional area of the annular space between the flange 9 of the piston and the shoulder 21 is of very large area compared to the area of the longitudinal groove or grooves 20 so that lubricant cannot pass through the latter in sufficient volume during piston travel toward the discharge port to procure pressure in said annular space equal to or even approximating that in the intake end of the casing so that some degree of vacuum is maintained in said annular space during said travel of the piston toward the discharge port which cooperates with the spring 14 to maintain the valve 11 seated against the action of the spring 16.

As soon as the flange 9 seats on the shoulder 18, the discharge of lubricant past check-valve 7 will cease and then, upon release of pipe and pump pressure, the spring 16 will overcome the spring 14 and cause the valve 11 to open as the full pressure of said spring in excess of the counter-spring 14 is now exerted on said valve 11. This excess pressure receives the cooperation of the resistance to reverse travel of the piston 8 due to the lubricant in the annular space between the flange 9 and shoulder 21 which can escape only relatively slowly for the same reason that it fills relatively slowly.

The valve 11 being now open and the check-valve 7 being closed, it follows that during return travel of the piston to initial position, the lubricant in the intake end of the casing 1 will pass through the piston 8 into the discharge end portion to provide the predetermined volume to be fed to the bearing at the next operation.

As the travel of the valve 11 is limited by contact with the end wall of the casing bordering the intake port 5, it will be obvious that as soon as said valve is so engaged the spring 14 will cause the piston 8 to continue travel until the valve 11 is again seated.

Valves of this type are usually screw-machine products which, without the exercise of a high degree of skill and care on the part of the operator in charge, are not usually very accurate. Consequently, a device that will permit of a large degree of tolerance between interfitting relatively movable parts are better adapted for screw-machine production than devices requiring very accurate machining. The structure above described permits greater variation in relative diameters of the interfitting relatively movable parts without defeating operativeness of the completed structure than is true of the other embodiments shown in the accompanying drawings and also permits greater variation in the respective spring pressures and is, hence, the preferred form of embodiment of the invention.

This embodiment is, furthermore, better adapted for lubricants which vary considerably in fluidity, either under the influence of variations in temperature or as between oils and greases, thus permitting changes in the type of lubricant used without necessitating a change in the discharge valve structure.

If it is desired to reduce the volume of lubricant discharged at each operation of the valve-structure of Figs. 1 to 3, the length of the larger diameter end portion of the piston may be increased or the length of the middle portion 1 of the casing reduced so that by interchanging pistons 8 or casing members 1, valves of varying capacities are produced at low cost.

The embodiment shown in Figs. 5 to 9 inclusive comprises the casing 22, which differs from the casing of Fig. 1 only in that the small bore portion 3 is omitted, the bore 23 extending from the intake port 25 to the small bore portion 24 leading to the discharge port 26 equipped with the spring-held check valve 27. The hollow trunk piston 28 is of the same outer diameter throughout its length, has the central opening bordered by the valve seat 29 on which the valve 30 seats. The latter and its stem 31 are of the same construction as is the valve 11 of Fig. 1, the stem being provided between its ends with the annular flange 32 with which the springs 33 and 34 engage, the latter being the same as the spring 16 of Fig. 1 and the former corresponding to the spring 14.

This structure operates the same as that of Fig. 1 except that the extra resistance to travel of the piston due to the flange 9, the groove or grooves 20 and the annular space between the flange 9 and shoulder 21 of Fig. 1 are lacking. Consequently in the structure of Figs. 5 to 9 inclusive, successful operation requires greater accuracy in the relative diameters of the bore 23 and the piston while the relative pressures exerted by the springs 33 and 34 must be more accurately adjusted since they bear a distinct relation to the difference in areas of the discharge face portion of the piston 28 and the intake face portion bordering the valve seat 29. In brief, the discharge end area of the piston plus wall frictional resistance to travel constitute the factors which cooperate with the spring 33 and the pressure of incoming lubricant to overcome the greater force of spring 34, while pressure of incoming lubricant on the area of the piston end bordering the valve seat 29 affords a factor cooperating with the spring 34 to open the valve 30 against the action of the spring 33.

The foregoing will serve to explain the nicety of relative spring pressures required to render this structure operative, these relative counteracting forces requiring the strengths of the respective springs to be determined by experiment for various sizes of said valve structures and variations in ratio of top and bottom piston face areas.

However, this structure is somewhat less expensive than that of Figs. 1 to 4 inclusive and permits of sufficient tolerances as to relative diameters of piston 28 and bore 23 and as to variations in springs to constitute the same a thoroughly practicable and efficient valve structure.

It will be readily understood and appreciated that the structures of both Figs. 1 and 5 are dependent for operation upon relative areas of the discharge and intake faces of the respective pistons. In the structure of Fig. 6 only that portion of the intake face of the piston bordering the valve seat of said end is subjected to pressure of the incoming lubricant and the area of this face relatively to the discharge face is easily varied by enlarging the said valve seat and the valve seating thereon. This is true also of the structure of Fig. 1 which, however, possesses the further advantage of producing the drag incident to the annular space between the flange 9 and shoulder 21.

The springs 14 and 33 are required to be sufficiently weak with respect to the springs 16 and 34 and with respect to the area of the intake faces of the respective pistons to cause the valves 8 and 28 to spring to open position the instant that pump and pipe pressure is relieved. To this end the springs 16 and 34, respectively, must be strong enough to not only overcome the counterpressure of springs 14 and 33, respectively, but also to overcome the fluid pressure resistance to opening of the piston valves by virtue of vacuum in the discharge end portion of the casing created at the instant of release of pressure in the intake end portion and the initial spring responsive return movement of the pistons.

In Fig. 10 I have illustrated another embodiment of the valve structure which operates on exactly the same principle as those above described but possesses certain structural advantages over the latter.

In this structure the casing 35 is provided at one end with a closure cap 36 having an annular externally threaded flange 37 terminating in an annular initially cylindrical lip 38. The intake port 39 is flared at the inner end of the cap wall and is bordered by an annular shoulder against which the marginal portion of a screen 40 abuts. A plug 41, having a central opening including a countersunk or flared portion 42 bordered by an annular shoulder abutting against the marginal portion of the screen 40, fits snugly in the bore of the flange 37 and is permanently held in place therein by crimping or contracting the lip 38 against the opposed tapered shoulder of said plug.

The latter is provided on its inner face with a relatively deep annular groove 43 which normally receives the annular flange 44 of the valve 45. The latter comprises a flat plate having a central stem 46 terminating in a projection 47.

The marginal portion of the valve 45 seats upon one end of a sleeve or hollow piston 48 provided at said end with an inwardly extending annular flange 49, the inner edge of which is spaced from the stem 46 sufficiently to accommodate the inwardly extending flange 50 at one end of a sheet metal sleeve 51 equipped at its other end with an outwardly extending flange 52.

A relatively light helical compression spring 53 is interposed between the flange 49 of the sleeve 48 and the flange 52 of the sleeve 51. A very much stronger compression spring 54 is interposed between the flange 50 of the sleeve 51 and a washer 55 disposed upon a fibre packing washer 56 disposed upon the end wall 57 of the casing 35. In the latter is a central opening or discharge port 58 controlled by the spring-held check valve 59.

In the marginal portion of the valve 45 are perforations 60 which are normally sealed by the opposed end of the sleeve 48.

The said sleeve 48 is adapted to seat at its lower end upon the annular shoulder 61 of the casing 35 to interrupt flow of lubricant.

The operation of this structure of Figs. 10, 11, and 12 is substantially identical with that of Figs. 5, 6, and 7, but presents two features not presented by the latter, one of which resides in providing the cup or well bordered by the flange 44 of the valve 45 into which the nozzle or intake spout of the plug 41 projects.

In the event that the lubricant used is of a high degree of viscosity such as would tend to prevent the sleeve or piston 48 from attaining full contact with the opposed face of the valve 45 under the influence of the spring 53, then the initial inflowing lubricant will exert a direct initial pressure upon the valve 45 before this pressure is felt throughout the intake end portion of the casing 35 and, therefore, at the perforations 60 of the valve 45. The resistance to travel of the sleeve or piston 48 offered by the lubricant in the discharge end of the casing will, therefore, cooperate with this initial pressure at the center of the valve 45 to cause displacement of lubricant interposed between said valve and said sleeve or piston 48 to insure full sealing contact.

As soon as the piston 48 seats on the shoulder 61 of the casing the flow of lubricant is interrupted but at this time the projection 47 bears upon the check valve 59 to hold the latter off its seat so that upon release of pump and pipe pressure the valve 45 will be enabled to start on its reverse movement without creating vacuum in the discharge end of the casing 35. Said valve 45 will thus instantly spring to open position whereupon lubricant will flow through the perforations 60 from the intake end portion of said casing, through the annular space between the flange 49 of the piston 48 and the sleeve 51 to the discharge end portion of said casing.

In the embodiment of Figs. 10, 11, and 12, it will be noted that the sleeve or piston area opposed to the lubricant in the discharge end of the casing during the discharge stroke of said piston is equal to the area of the discharge face of said piston plus that of the flange 49 whereas the piston area exposed to the pressure of the lubricant in the intake end of the casing is that of the aggregate perforations 60 of the valve 45 plus a very narrow annular piston area bordering the circumferential edge of said valve 45. Hence, the differential piston areas exposed to fluid pressure on the discharge stroke of the piston 48 and valve 45 are such as to readily adapt this structure for use with either very fluent light oils or heavy greases.

The projection 47 of the stem 46 of the valve 45 may, in most instances, be omitted and particularly when the lubricant used is a very fluent light oil.

In the structure of Figs. 1 to 3, the annular space between the flange 9 of the piston and the shoulder 21 of the casing constitutes what may be termed secondary or auxiliary fluid pressure responsive means for retarding the movement of the piston in both directions and coacting with both springs 14 and 16 to maintain the valve 11 closed during travel of the piston toward the discharge port and to maintain said valve open during spring return movement of said piston. In the structure of Fig. 10, the spout of the plug 41 coacting with the flange 44 of the valve 45 may also be defined as a secondary fluid pressure responsive means for insuring initial closure of said valve 45.

While I have shown and described the several foregoing embodiments of the invention as applied to force-feed lubricating systems, the same may very obviously be used for discharging measured volumes of other liquids or viscous substances.

In use, a machine or a series of machines having shafts and bearings of various sizes with respect to diameter, length and speed of rotation may be equipped with discharge valves of any one of the above types of varying sizes selected to meet the needs of each of the bearings and all of these valves connected by suitable piping or tubing with a single pump of a capacity greater than the aggregate capacities of all of the said valves.

A lubricant may be fed from the pump at any desired pressure, the minimum of which must be sufficient to overcome the resistance of the several springs 16, 34, or 54, the springs of the check valves at the discharge ends of the casings and the resistance offered by the tightest bearing of the group fed by the pump. The maximum pressure of the lubricant may be as high as the operator desires.

A pump of the type shown in Fig. 1 of the drawings of Patent No. 1,652,764 may be used in connection with the above described discharge valves, said patent also illustrating a suitable arrangement of piping connecting the several valves with the discharge port of said pump.

Any ordinary pump provided with a check valve controlled discharge port may also be used in connection with the valves shown and described and particularly in connection with the structure of Figs. 1 to 3, but in such case the check valves controlling the discharge ports of the valve casings must be omitted.

I claim as my invention:

1. A valve of the type specified comprising a casing having a cylindrical bore and provided at opposite ends with intake and discharge ports, a hollow piston reciprocable in said casing and provided with a passage for fluid therethrough, a valve seat bordering one end of said passage and being opposed to the intake port of the casing, a valve controlling said passage and adapted to seat on said valve seat, a spring arranged to maintain said valve normally closed, a second and more powerful spring arranged to maintain said valve open during absence of fluid pressure thereon counter to said spring and to maintain said piston normally at the intake end of said casing, the end wall of the latter bordering the intake port thereof constituting a stop limiting the travel of said valve under the influence of the more powerful spring to thereby cause the first-mentioned spring to seat said valve, and an annular shoulder in the discharge end portion of said casing on which said piston is adapted to seat to interrupt flow of lubricant from the discharge port of said casing as said piston is actuated against the action of the more powerful spring by fluid under pressure entering the intake port of said casing.

2. A valve structure comprising a casing having intake and discharge ports at opposite ends, a piston reciprocable in said casing and provided with a passage for fluid therethrough, a valve seat bordering one end of said passage and opposing said intake port, a valve adapted to seat on said valve seat, a spring operatively associated with said valve to maintain the same normally closed to seal said passage, a more powerful spring associated with said valve and said casing for maintaining said valve open as the piston is moved toward the intake end of said casing thereby, and means coacting with said valve and piston for interrupting discharge of fluid from the discharge port of said casing as said piston attains a predetermined position in its discharge stroke under the influence of fluid under pressure entering the intake port of said casing.

3. A valve of the type specified comprising a casing having a cylindrical bore and equipped at opposite ends with an intake port and a discharge port, a hollow piston reciprocable in said casing and equipped with a valve seat opposed to the intake port, a valve adapted to seat on said valve seat, a spring arranged to maintain said valve normally closed, a second and more powerful spring opposed to said first-named spring and arranged to maintain the said valve open and move the piston toward the intake end of the casing in the absence of fluid pressure in the said end portion of said casing, means coacting with said valve and piston for interrupting discharge of said fluid from the discharge port of said casing as said piston attains a predetermined position in its discharge stroke under the influence of fluid under pressure entering the intake port of said casing, the piston area opposed to said discharge port being greater than the area thereof opposed to the intake port.

4. A valve structure comprising a casing having an intake port at one end and discharge port at its other end, a piston reciprocable in said casing and provided with a by-pass duct for the passage of fluid from the intake to the discharge end portions of the casing, a valve seat bordering one end of said duct and opposed to the intake port of the casing, a valve adapted to seat on said valve seat, a spring engaged with said valve and said piston for normally maintaining said valve closed, a more powerful spring engaged with said valve for causing the same to open during travel of the piston toward the intake end portion of the casing and coacting with the first-named spring for maintaining said piston disposed at one limit of its movement, and means in the discharge end portion of the casing cooperating with said valve and piston for interrupting flow of fluid from the discharge port of said casing at a given point in the travel of said piston responsively to fluid under pressure entering said intake port, the piston area opposed to said discharge port being greater than the area thereof opposed to the intake port.

5. A valve structure comprising a differential diameter cylindrical valve casing provided at the end portion of smaller diameter with an intake port and at its other end with a discharge port, a differential diameter piston reciprocable in said casing and having respective end portions disposed and maintained in said corresponding portions of the casing during travel, a by-pass duct connecting the intake end portion of the casing with the discharge end portion thereof, a normally closed spring-held valve controlling said duct, a spring maintaining the piston normally disposed at the intake end portion of said casing, said springs cooperating with fluid pressure resistance to travel of said piston in respectively opposite directions to maintain said valve closed as said piston moves toward the discharge port responsively to fluid under pressure entering the intake port and to maintain the said valve open during reverse travel of said piston.

6. A valve structure comprising a casing provided with inlet and discharge ports at respectively opposite ends, a floating piston reciprocable between said ports and presenting a larger area end face opposed to the discharge than to the intake port, a by-pass duct connecting the intake end portion of the casing with the discharge end portion thereof, a normally closed spring-held valve controlling said duct, a spring maintaining the piston normally disposed at the intake end portion of said casing, said springs cooperating with fluid pressure resistance to travel of said piston in respectively opposite directions to maintain said valve closed as said piston moves toward the discharge port responsively to fluid under pressure entering the intake port and to maintain the said valve open during reverse travel of said piston.

7. A valve structure comprising a casing having an inlet and a discharge port, a piston reciprocable in said casing between said ports, a by-pass duct through said piston, a valve controlling said duct, a pair of opposed springs of respectively different power engaged with said valve, one of said springs being engaged with the piston for normally maintaining said valve closed and co-operating with fluid under pressure entering the intake port of said casing to maintain said valve closed during travel of said piston responsively to said fluid under pressure, the other of said springs being engaged with the casing and adapted to maintain said valve open and move the piston toward the intake end of the casing as said valve attains open position to thereby cause transfer of fluid from the intake to the discharge end portion of said casing through said duct.

8. A valve structure comprising a casing having an inlet and a discharge port, a piston reciprocable in said casing between said ports, a by-pass duct through said piston, a valve controlling said duct, a pair of opposed springs of respectively different power engaged with said valve, one of said springs being engaged with the piston for normally maintaining said valve closed and co-operating with fluid under pressure entering the intake port of said casing to maintain said valve closed during travel of said piston responsively to said fluid under pressure, the other of said springs being engaged with the casing and adapted to maintain said valve open and move the piston toward the intake end of the casing as said valve attains open position to thereby cause transfer of fluid from the intake to the discharge end portion of said casing through said duct, and means coacting with said last-named spring for resisting travel of said valve responsively to entry of said fluid under pressure.

9. A valve structure comprising a casing having an inlet and a discharge port, a piston reciprocable in said casing between said ports, a by-pass duct through said piston, a valve controlling said duct, a pair of opposed springs of respectively different power engaged with said valve, one of said springs being engaged with the piston for normally maintaining said valve closed and co-operating with fluid under pressure entering the intake port of said casing to maintain said valve closed during travel of said piston responsively to said fluid under pressure, the other of said springs being engaged with the casing and adapted to maintain said valve open and move the piston toward the intake end of the casing as said valve attains open position to thereby cause transfer of fluid from the intake to the discharge end portion of said casing through said duct, and fluid pressure means within said casing co-operating with said last-named spring for resisting travel of said piston responsively to entry of said fluid under pressure.

10. A valve structure comprising a casing having an inlet and a discharge port, a piston reciprocable in said casing between said ports, a by-pass duct through said piston, a valve controlling said duct, a pair of opposed springs of respectively different power engaged with said valve, one of said springs being engaged with the piston for normally maintaining said valve closed and co-operating with fluid under pressure entering the intake port of said casing to maintain said valve closed during travel of said piston responsively to said fluid under pressure, the other of said springs being engaged with the casing and adapted to maintain said valve open and move the piston toward the intake end of the casing as said valve attains open position to thereby cause transfer of fluid from the intake to the discharge end portion of said casing through said duct, and fluid pressure means within said casing co-operating with said last-named spring for resisting travel of said piston responsively to entry of said fluid under pressure, and co-operating with the spring normally maintaining said valve closed to prevent relative movement of said valve and said piston during said fluid responsive travel of said piston.

11. A valve structure comprising a casing having an inlet and a discharge port, a piston reciprocable in said casing between said ports, a by-pass duct through said piston, a valve controlling said duct, a pair of opposed springs of respectively different power engaged with said valve, one of said springs being engaged with the piston for normally maintaining said valve closed and co-operating with fluid under pressure entering the intake port of said casing to maintain said valve closed during travel of said piston responsively to said fluid under pressure, the other of said springs being engaged with the casing and adapted to maintain said valve open and move the piston toward the intake end of the casing as said valve attains open position to thereby cause transfer of fluid from the intake to the discharge end portion of said casing through said duct, and fluid pressure means within said casing co-operating with the spring normally maintaining said valve closed to prevent relative movement of said valve and said piston during said fluid responsive travel of said piston.

12. A valve of the type specified comprising a casing having an intake and a discharge port, a reciprocable member disposed between said ports, a check-valve controlling one of said ports, said member being fluid pressure responsive for travel in one direction, a spring for effecting travel thereof in the other direction, fluid pressure means between said member and said casing for resisting travel of said member in both directions, a by-pass duct through said member arranged to normally prevent flow of fluid therethrough from the intake to the discharge end portion of said casing, said spring engaged with said valve and co-operating with said fluid pressure means to open said valve upon relief of the fluid pressure effecting travel of said piston against the action of said spring.

13. A valve of the type specified comprising a casing having an intake port and a discharge port, a fluid pressure responsive member reciprocable in said casing between said ports, a spring for resisting fluid pressure responsive travel of said member, a by-pass duct through the latter, a spring-held normally closed valve controlling said duct and engaged with said spring for opening by the latter, and fluid pressure means interposed between said member and said casing for resisting travel of said member in either direction, said valve being responsive to fluid under pressure entering the intake port of said casing to close the same and said fluid under pressure coacting with said fluid pressure means to prevent opening of said valve during fluid pressure responsive travel of said piston.

14. A valve of the type specified comprising a casing having a cylindrical bore and provided at opposite ends with intake and discharge ports, a hollow piston reciprocable in said casing and provided with a passage for fluid therethrough, a valve seat bordering one end of said passage, a valve controlling said passage, a valve adapted to seat on said valve seat, said valve seat being opposed to the intake port of the casing, a spring arranged to maintain said valve normally closed, a second and more powerful spring arranged to maintain said valve open during the return movement of the piston after discharge stroke and to maintain said piston normally at the intake end of said casing, the end wall of the latter bordering the intake port thereof constituting a stop limiting the travel of said valve under the influence of the more powerful spring to thereby cause the first-mentioned spring to seat said valve, and an annular shoulder in the discharge end portion of said casing on which said piston is adapted to seat to interrupt flow of lubricant from the discharge port of said casing as said piston is actuated against the action of the more powerful spring by fluid under pressure entering the intake port of said casing.

15. A lubricant supply valve comprising a casing equipped with an intake port at one end and a discharge port at its other end, a piston reciprocable in said casing and provided with a passage therethrough, a valve controlling said passage and adapted to be maintained closed by fluid under pressure entering the intake port of the casing and cause the piston to move toward the discharge port, a spring for maintaining said valve closed independently of fluid pressure, a more powerful spring engaged with said valve and the discharge end of the casing and opposed to the first-named spring and adapted to open said valve and move said piston toward the intake port upon relief of said fluid pressure and means in the discharge port end of said casing for limiting the travel of said piston under the influence of said fluid under pressure.

16. A lubricant supply valve comprising a casing equipped at opposite ends with an intake and a discharge port respectively, a piston reciprocable between said ports and equipped with a passage therethrough, a valve arranged to close the end of said passage opposed to the intake port to prevent passage of inflowing fluid through said passage, a stop for limiting opening movement of said valve, a light spring engaged with said piston and said valve for maintaining the latter closed and a more powerful spring engaged with said valve in opposition to said first-mentioned spring and engaged with the discharge port end of the casing and acting to hold said valve engaged normally with the intake end portion of the casing, said casing equipped with a stop formation for limiting travel of the piston toward the discharge end of the casing as the valve is moved in said direction against the action of the last named spring by fluid under pressure entering the casing, said last-named spring acting to open said valve upon relief of said fluid pressure and maintain the same open during the return stroke of said piston under the influence of said spring.

17. A lubricant supply valve comprising a casing equipped at opposite ends with an intake and a discharge port respectively, a check valve controlling said discharge port, a piston reciprocable between said ports and equipped with a passage therethrough, a valve arranged to close the end of said passage opposed to the intake port to prevent passage of inflowing fluid through said passage, a stop for limiting opening movement of said valve, a light spring engaged with said piston and said valve for maintaining the latter closed and a more powerful spring engaged with said valve in opposition to said first-mentioned spring and engaged with the discharge port end of the casing and acting to hold said valve engaged normally with the intake end portion of the casing, said casing equipped with a stop formation for limiting travel of the piston toward the discharge end of the casing as valve is moved in said direction against the action of the last named spring by fluid under pressure entering the casing, said last-named spring acting to open said valve upon relief of said fluid pressure and maintain the same open during the return stroke of said piston under the influence of said spring.

IRVING COWLES.